United States Patent
Wittorf

(10) Patent No.: US 9,315,090 B2
(45) Date of Patent: Apr. 19, 2016

(54) VENTILATION ARRANGEMENTS FOR MOTOR VEHICLES

(75) Inventor: Marten Wittorf, Ingleheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 978 days.

(21) Appl. No.: 13/457,591

(22) Filed: Apr. 27, 2012

(65) Prior Publication Data

US 2012/0276833 A1 Nov. 1, 2012

(30) Foreign Application Priority Data

Apr. 29, 2011 (DE) .......................... 10 2011 100 059

(51) Int. Cl.
  *B60H 1/34* (2006.01)
(52) U.S. Cl.
  CPC ...... *B60H 1/3421* (2013.01); *B60H 2001/3471* (2013.01)
(58) Field of Classification Search
  USPC ........................................................ 454/155
  IPC .................................. B60H 1/3421,2001/3471
  See application file for complete search history.

(56) References Cited

U.S. PATENT DOCUMENTS

| | | | |
|---|---|---|---|
| 4,610,196 A | 9/1986 | Kern | |
| 4,840,115 A | 6/1989 | Johnson et al. | |
| 5,752,877 A * | 5/1998 | Sun | 454/155 |
| 6,554,696 B2 | 4/2003 | Kowalski et al. | |
| 7,517,279 B2 | 4/2009 | Kober et al. | |
| 2002/0121102 A1 | 9/2002 | Kamuf | |
| 2005/0176364 A1* | 8/2005 | Gehring et al. | 454/155 |

FOREIGN PATENT DOCUMENTS

| | | |
|---|---|---|
| DE | 3509537 A1 | 9/1986 |
| DE | 3714820 A1 | 12/1988 |
| DE | 19961161 A1 | 6/2001 |
| DE | 20109826 U1 | 10/2002 |
| DE | 10303114 B3 | 8/2004 |
| DE | 102005003877 A1 | 7/2006 |
| DE | 102006004243 A1 | 8/2007 |

(Continued)

OTHER PUBLICATIONS

German Patent Office, German Search Report dated Dec. 13, 2011 for German Application No. 102011100059.7.

*Primary Examiner* — Steven B McAllister
*Assistant Examiner* — Helena Kosanovic
(74) *Attorney, Agent, or Firm* — Ingrassia Fisher & Lorenz PC

(57) ABSTRACT

A ventilation arrangement includes a console with a surface in which a receptacle is formed. An air outlet is moveably mounted on the console for movement between an opening and a closing position. In the opening position the air outlet protrudes from the receptacle and in the closing position is at least partially flush-mounted in the receptacle. Air guiding elements guide air flowing out of an airflow opening of the air outlet. The air guiding elements are at least partially displaceably mounted on a support structure of the air outlet between an opening and a closing position. The air guiding elements in the opening position are displaceable into working positions in which adjacent air guiding elements have a larger intermediate spacing, and in the closing position into rest positions wherein the elements have a smaller intermediate spacing than in the working positions or lie on one another.

12 Claims, 10 Drawing Sheets

(56) References Cited

FOREIGN PATENT DOCUMENTS

| DE | 102006015121 | A1 | 10/2007 |
| DE | 102006029733 | A1 | 1/2008 |
| DE | 102006056917 | A1 | 6/2008 |
| EP | 0539843 | A2 | 5/1993 |
| EP | 0846580 | A2 | 6/1998 |
| FR | 2819756 | A1 | 7/2002 |
| FR | 2831109 | A1 | 4/2003 |
| WO | 2004039629 | A1 | 5/2004 |

* cited by examiner

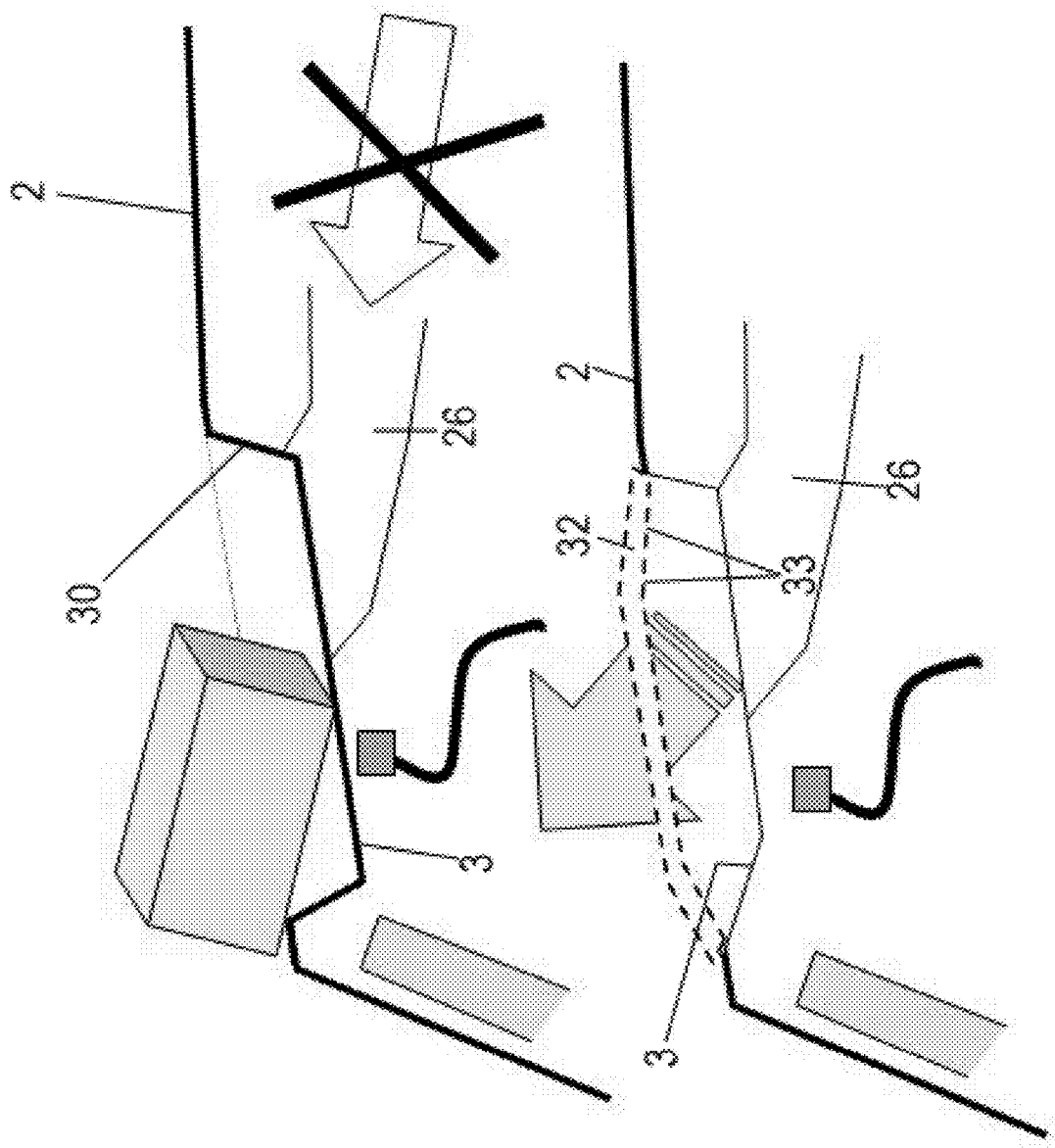

ive air outlet can be displaced in working positions, in
VENTILATION ARRANGEMENTS FOR MOTOR VEHICLES

CROSS-REFERENCE TO RELATED APPLICATION

This application claims priority to German Patent Application No. 10 2011 100 059.7, filed Apr. 29, 2011, which is incorporated herein by reference in its entirety.

TECHNICAL FIELD

The technical field generally lies in the field of motor vehicle construction and more particularly relates to a ventilation arrangement on a vehicle console.

BACKGROUND

Dashboards or instrument panels installed in motor vehicles typically comprise air outlets that are installed in a fixed manner. The air outlets are connected to a ventilation system for ventilating the vehicle interior. As a general rule, the direction of the airstream issuing from an air outlet opening can be changed through rotatable slats. For regulating the intensity of the airstream, a mechanical or electronic regulating device is provided. In practice it has been shown that air outlets installed in a fixed manner have a tendency to becoming dirty. Cleaning of the slats involves a certain effort.

For an effective cooling/heating or air-conditioning of the vehicle interior it is advantageous when the air outlets are mounted relatively high on the dashboard. In addition, many vehicle occupants perceive it as pleasant when the airstream meets upper parts of the body. From the series production of motor vehicles, arrangements are known wherein air outlets installed in a fixed manner are fitted onto the dashboard. Disadvantageous is that the air outlets protrude relatively far upwards and can impair the esthetic appearance of the dashboard. In addition, there is also the problem that the air outlets even positioned here in a prominent location tend to get dirty.

The German patent application DE 19961161 A1 and the U.S. Pat. No. 5,752,877 describe air outlets which can be moved into an opening and closing position, wherein the air outlets in closing position can be flush-mounted in a receptacle of the dashboard.

SUMMARY

Various embodiments of ventilation arrangements for a motor vehicle are provided. In an exemplary embodiment, the ventilation arrangement comprises a console with a console surface in which a console opening or receptacle is formed. The console, for example but not necessarily, is a dashboard or instrument panel arranged in the front region. On the console, an air outlet is moveably mounted, wherein the air outlet can be moved into an opening position and closing position. In a configuration of the ventilation arrangement, the air outlet in an opening position protrudes from the receptacle, so that an air outflow opening is free and air can flow out into the vehicle interior. On the other hand, the air outlet in a closing position is at least partially, in particular, completely flush-mounted in the receptacle. In a configuration of the ventilation arrangement, the air outlet is pivotably articulated on the console for this purpose, but wherein it is equally conceivable to lift and to lower the air outlet for example by means of a lifting arm. In particular, the air outlet can be designed so that in closing position it forms a part of the console surface and in particular closes flush with the adjoining console surface.

In an embodiment of the ventilation arrangement, the air outlet comprises a plurality of air guiding elements for guiding air flowing out of the air outflow opening, of which at least some or a part, in particular all air guiding elements, are displaceably mounted on a support structure of the air outlet. In particular, the air guiding elements can be displaceably mounted on a housing of the air outlet. The displaceable air guiding elements are mounted so that in opening position of the air outlet they can be displaced in working positions, in which adjacent air guiding elements have a larger intermediate spacing. In closing position through interaction with at least one console-fixed stop, the air guiding elements can be displaced into rest positions, in which adjacent air guiding elements have a smaller intermediate spacing than in their working positions or even come to lie on one another. In a configuration of the ventilation arrangement, the air guiding elements have an elongated shape, wherein they can be designed in particular as (leaf-like) slats. In a configuration, the elongated air guiding elements are arranged in the receptacle with their longitudinal extension transversely to a movement direction for flush-mounting the air outlet.

The ventilation arrangement according to an embodiment makes possible that the air guiding elements on flush-mounting of the air outlet in the receptacle can be pushed together so that these use up comparatively little installation space in the interior of the console. The air outlet can thus be placed in a position that is suitable for the ventilation or cooling/heating or air-conditioning of the vehicle interior without substantially impairing installation space requirements of other function parts of the console.

In an embodiment of the ventilation arrangement, the displaceable air guiding elements are displaceably mounted on the support structure, in particular housing, so that in opening position of the air outlet they can automatically reach their working positions because of the effect of gravity. This measure makes possible a particularly simple arrangement of the air guiding elements in opening position of the air outlet.

In another embodiment of the ventilation arrangement, the air guiding elements are received for the displaceable mounting on the support structure, in particular housing, in each case in engagement recesses located opposite. The engagement recesses located opposite each other each have an intermediate spacing, wherein the intermediate spacings of opposite engagement recesses increase with increasing distance from the stop. In this regard, the engagement recesses to this end are designed in the form of engagement step sequences located opposite each other, wherein the air guiding elements in each case can come to lie on engagement steps located opposite. This measure makes possible a technically particularly simple and cost-effective realization of the displaceable mounting of the air guiding elements.

In an embodiment of the ventilation arrangement, at least one elastically deformable intermediate element, for example, a spring element or an elastomer body, is arranged between adjacent air guiding elements. The intermediate element causes the air guiding elements to automatically reach the working position where they are fixed in position. This measure can be realized through the effect of gravity in addition or alternatively to the fanning-open.

In yet another embodiment of the ventilation arrangement, the receptacle of the console is covered with an elastically deformable cover, which comprises a covering opening. Here, the air outlet elastically deforms the cover in opening position, wherein the cover opening exposes the air outflow opening so that air can flow into the passenger interior. Through the covering, a marginal gap between flush-mounted air outlet and receptacle can be concealed, so that the console surface can be designed particularly attractively in aesthetic terms. Generally, the cover opening will elastically expand in opening position of the air outlet and contract in closing position, so that the cover opening in closing position is reduced in size compared with the opening position.

In an exemplary embodiment of the ventilation arrangement, the air outlet is detachably mounted to the console and the receptacle of the console is designed in order to insert a plurality of function parts, for example a drawer for loading with items, in particular with integrated air outlet or an air outflow cover provided with a plurality of holes for the indirect ventilation of the vehicle interior. This measure makes possible a variable utilization of the receptacle of the console so that, depending on requirement, different function parts can be inserted.

The air outlet is provided with a device for regulating the airstream issuing from the air outlet opening, in accordance with an exemplary embodiment.

In another embodiment, the air outlet is coupled to a motor drive, in particular electric motor, for moving into opening and closing positions.

In yet a further embodiment, the ventilation arrangement comprises a console with an elastically deformable console surface in which a console opening or break-through is formed. In addition, an air outlet moveably mounted below the console surface is provided, which can be moved into an opening position and closing position. The air outlet in opening position deforms the console surface so that air can flow out through the console opening. In this regard, a particularly attractive aesthetic appearance of the console surface both in opening position as well as in closing position is made possible in a technically simple manner. The air outlet additionally comprises a plurality of air guiding elements for guiding air flowing out from the air outflow opening. The air guiding elements at least in part are displaceably mounted on a support structure, in particular a housing, of the air outlet. The displaceable air guiding elements in opening position can be displaced in working positions. Adjacent air guiding elements in working position have a larger intermediate spacing, and in closing position can be displaced into rest positions through interaction with at least one console-fixed stop. Adjacent air guiding elements in rest position have a smaller intermediate spacing than in opening position or come to lie on one another.

A console for a motor vehicle is further provided herein. The console has a console surface in which a console opening or receptacle is formed. The console opening or receptacle provides for connection to a ventilation system. Here, the receptacle is configured to receive different function parts, for example an air outlet, a drawer for loading with items, in particular with integrated air outlet, or an air outflow cover provided with a plurality of holes for the indirect ventilation of the vehicle interior.

A motor vehicle which is equipped with at least one ventilation arrangement as described above and/or with at least one console as described above is further provided herein.

BRIEF DESCRIPTION OF THE DRAWINGS

The exemplary embodiments will hereinafter be described in conjunction with the following drawing figures, wherein like numerals denote like elements, and wherein:

FIGS. 10A-10B show schematic longitudinal sections through the ventilation arrangement of FIG. 9 according to two exemplary embodiments.

DETAILED DESCRIPTION

The following detailed description is merely exemplary in nature and is not intended to limit the application and uses of the various embodiments. Furthermore, there is no intention to be bound by any theory presented in the preceding background of the invention or the following detailed description.

Figure 1:
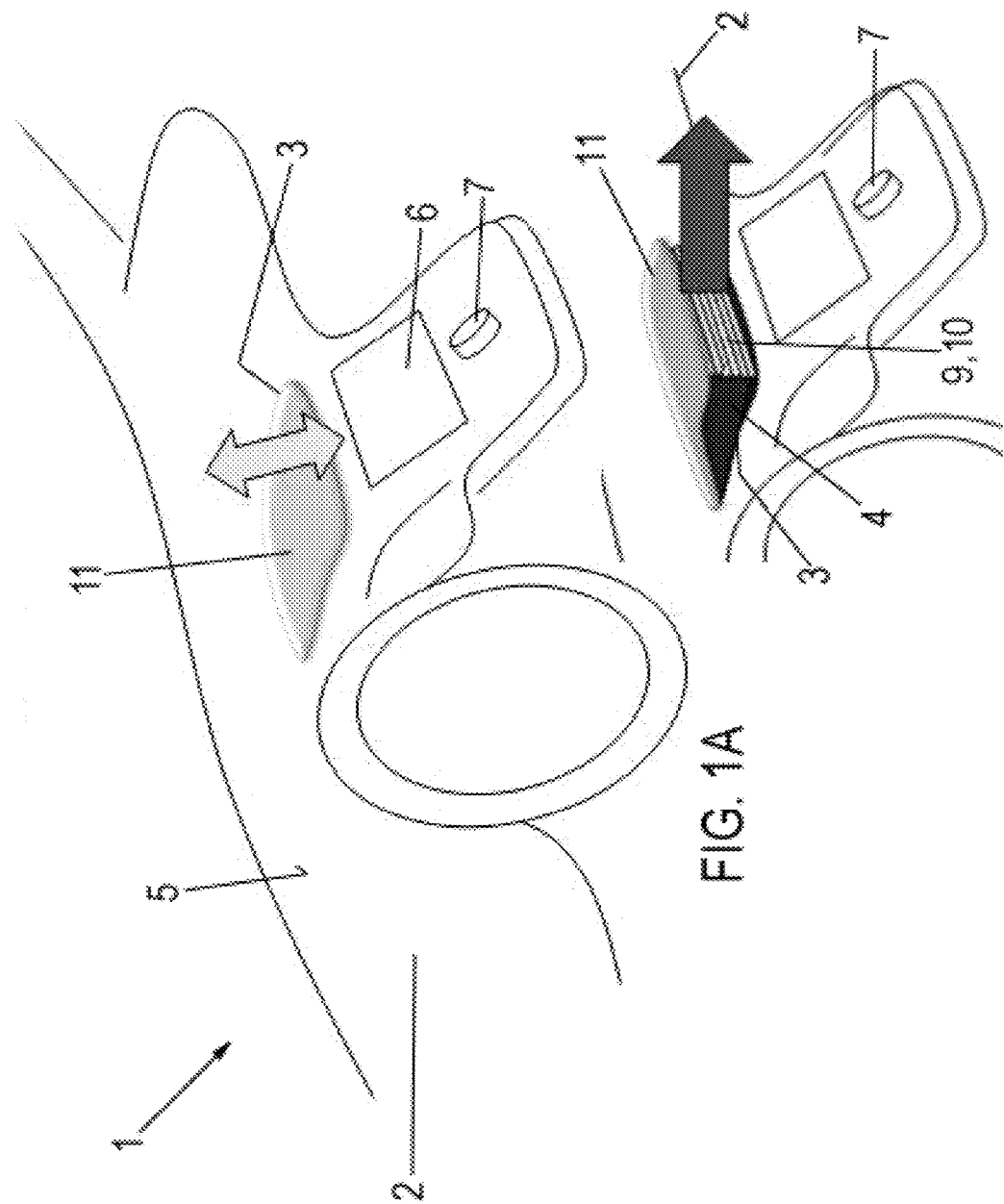
FIGS. 1A-1B show perspective views of a motor vehicle console with a ventilation arrangement in closing position (FIG. 1A) and opening position (FIG. 1B) in accordance with an exemplary embodiment.

Referring to FIGS. 1 and 1B, a console 2 configured as a dashboard or instrument panel of a motor vehicle (not shown) includes a ventilation arrangement designated with the reference number 1 as a whole. The ventilation arrangement 1 comprises an air outlet 4 received in a rectangular receptacle 3 of the console 2. FIG. 1A shows the air outlet 4 in a closing position, in which the air outlet 4 is at least partially, in particular completely flush-mounted in the receptacle 3. A housing 8 of the air outlet 4 forms a part of the console surface 5 and closes off flush with the latter. FIG. 1B shows the air outlet 4 in an opening position, wherein the housing 8 of the air outlet 4 protrudes from the receptacle 3 and an air outflow opening 9 formed by the housing 8 is exposed so that air can be given off into the vehicle interior. The housing 8 of the air outlet 4 can be provided with a support 11 matched to the console surface 5, which is for example elastically deformable. For moving the air outlet 4 in opening position and closing position, it is pivotably articulated on the console 2 on a side located opposite the air outflow opening 9, which is not shown in more detail in FIG. 1. Through a plurality of parallel slats 10 in the housing 8, the direction of the airstream issuing from the air outflow opening 9 can be changed. For charging with flowing air, the air outlet 4 is fluidically coupled to a ventilation system of the motor vehicle. The person skilled in the art is well aware of possible configurations of the ventilation system, so that this need not be discussed in more detail here.

In FIGS. 1A and 1B, further function parts of the console 2 are evident, in this case for example a (multifunction) display 6 and a control button 7.

Figure 2:
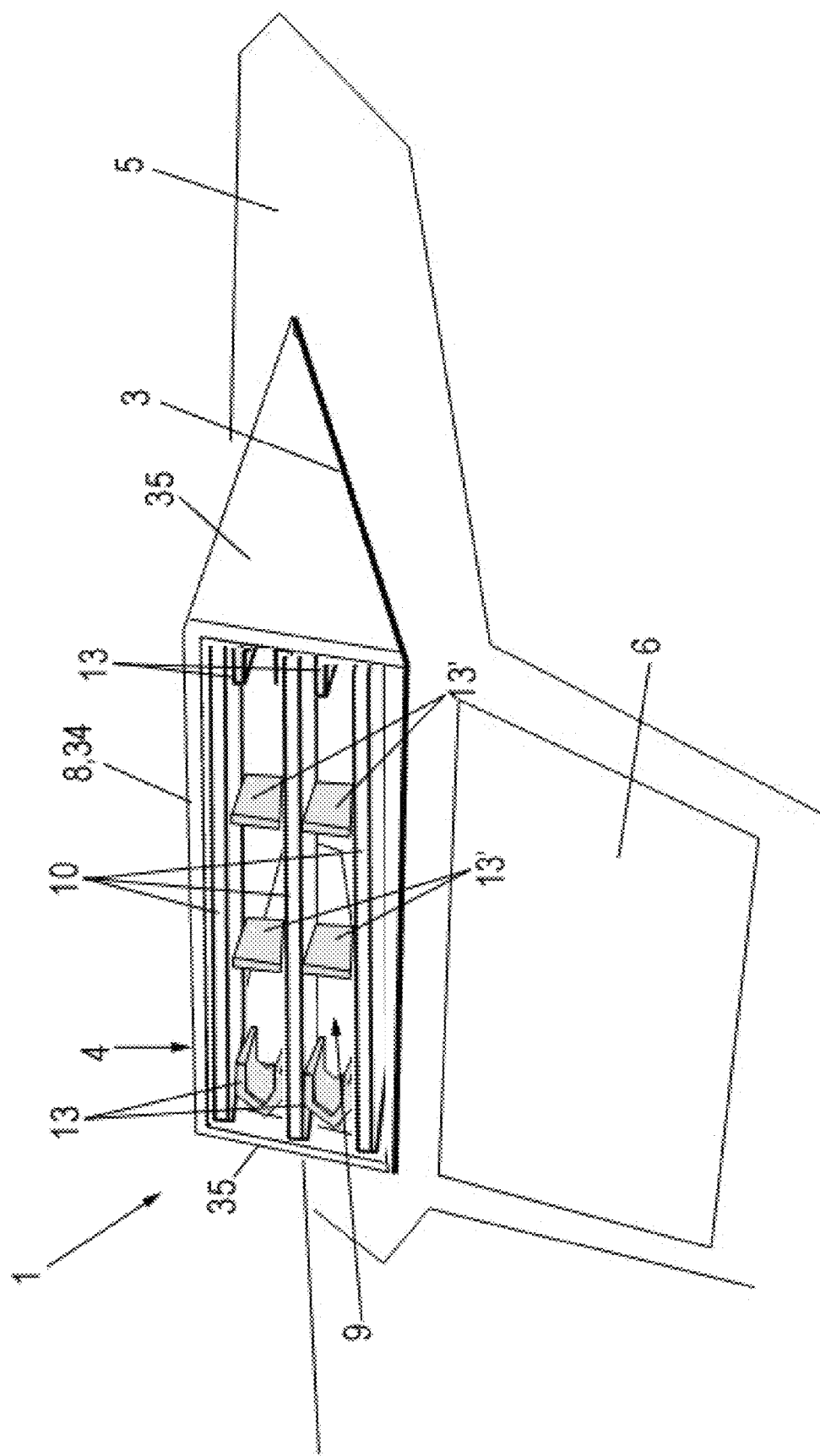
FIG. 2 shows a perspective view of the air outlet of the ventilation arrangement of FIG. 1.
Figure 3:
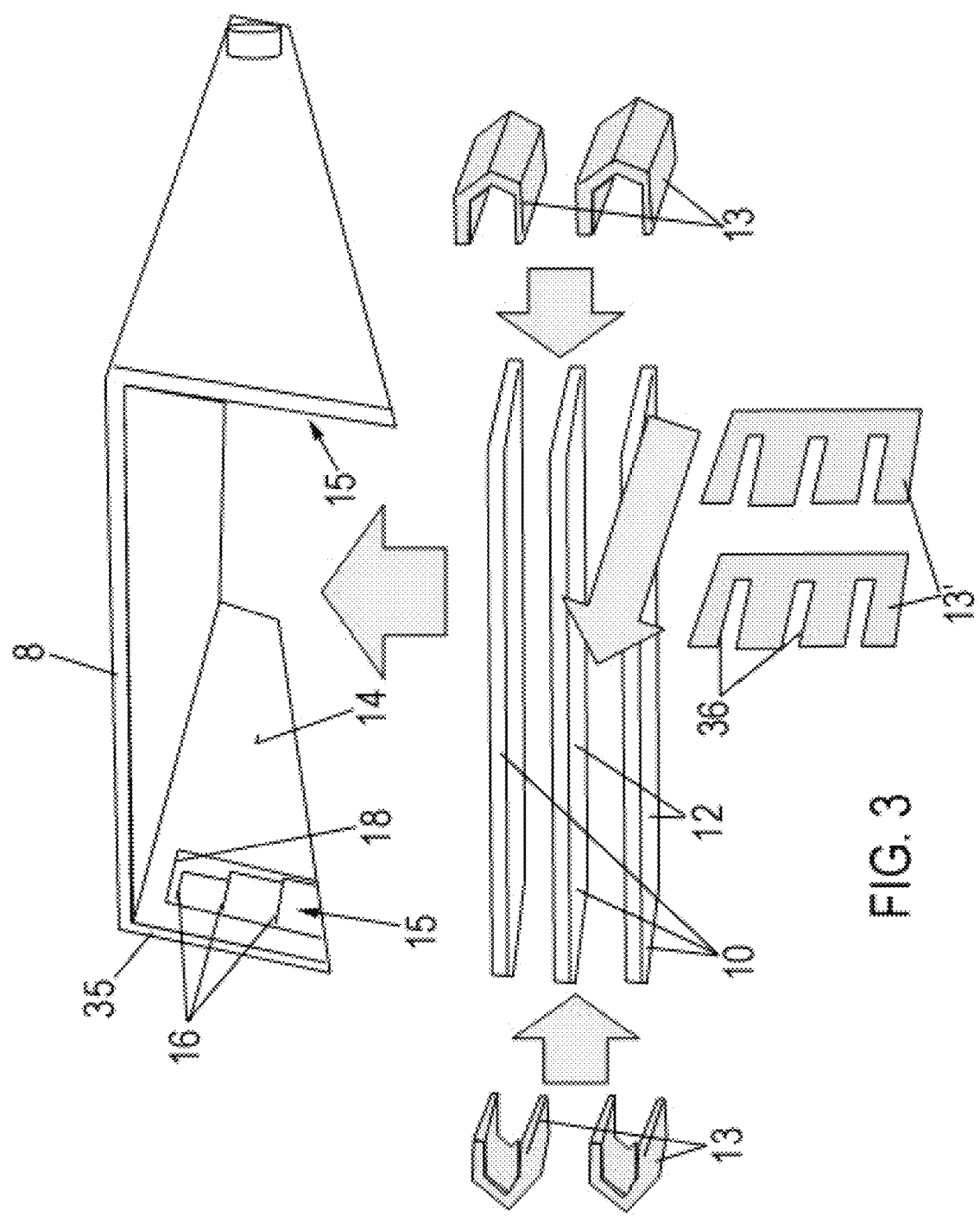
FIG. 3 shows an exploded representation of the air outlet of FIG. 2.

FIG. 2 shows an enlarged perspective view of the air outlet 4 of the ventilation arrangement 1 from FIG. 1 in an opening position, wherein for purposes of a simpler representation the support 11 is not shown. Noticeably, the housing 8 has a U-shaped structure without lower limitation and consists of a transversely positioned covering wall 34 and two perpendicular side walls 35. The slats 10 in this case are designed for example as rectangular flat bodies with slat surfaces 12 and are arranged stacked on top of one another. The slat surfaces 12 each extend transversely to the pivot direction of the air outlet 4. Although merely three slats 10 are shown, it is to be understood that the air outlet 4 can also comprise a larger number of slats 10. Between adjacent slats 10, elastomer bodies 13, 13' consisting of an elastically deformable material are arranged. In the exploded representation of FIG. 3, the elastomer bodies 13, 13' are shown in detail. Accordingly, two substantially U-shaped elastomer bodies 13 are each arranged at the ends between adjacent slats 10. Further comb-like slit elastomer bodies 13' are fitted to the back of the slats 10, wherein the slats 10 are received in slits 36. In FIG. 3, the placing of the elastomer bodies 13, 13' is illustrated by the arrows.

As is additionally shown in FIG. 3, an engagement step sequence 15 is worked into each of the inner surfaces 14 of the side walls 35 of the housing 8 located opposite one another. Each engagement step sequence 15 is composed of a plurality of engagement steps 16 each designed in the form of a recess, which are arranged one after the other along the pivot direction of the air outlet 4. The two engagement step sequences 15 are designed so that in each case two engagement steps 16 are located opposite each other. Here, the depth of the engagement step 16 increases towards the top or in pivot direction for opening the air outlet 4, so that engagement steps 16 located opposite one another have a larger intermediate spacing.

In the air outlet 4, engagement steps 16 located opposite one another in each case serve for the mounting of an individual slat 10, wherein the slat length is matched to the different intermediate spacings of the engagement steps 16 located opposite each other. Through the expanding spacing of engagement steps 16 located opposite each other, the slats 10 can be displaced upwards or in pivot direction for opening the air outlet 4.

Figure 4:
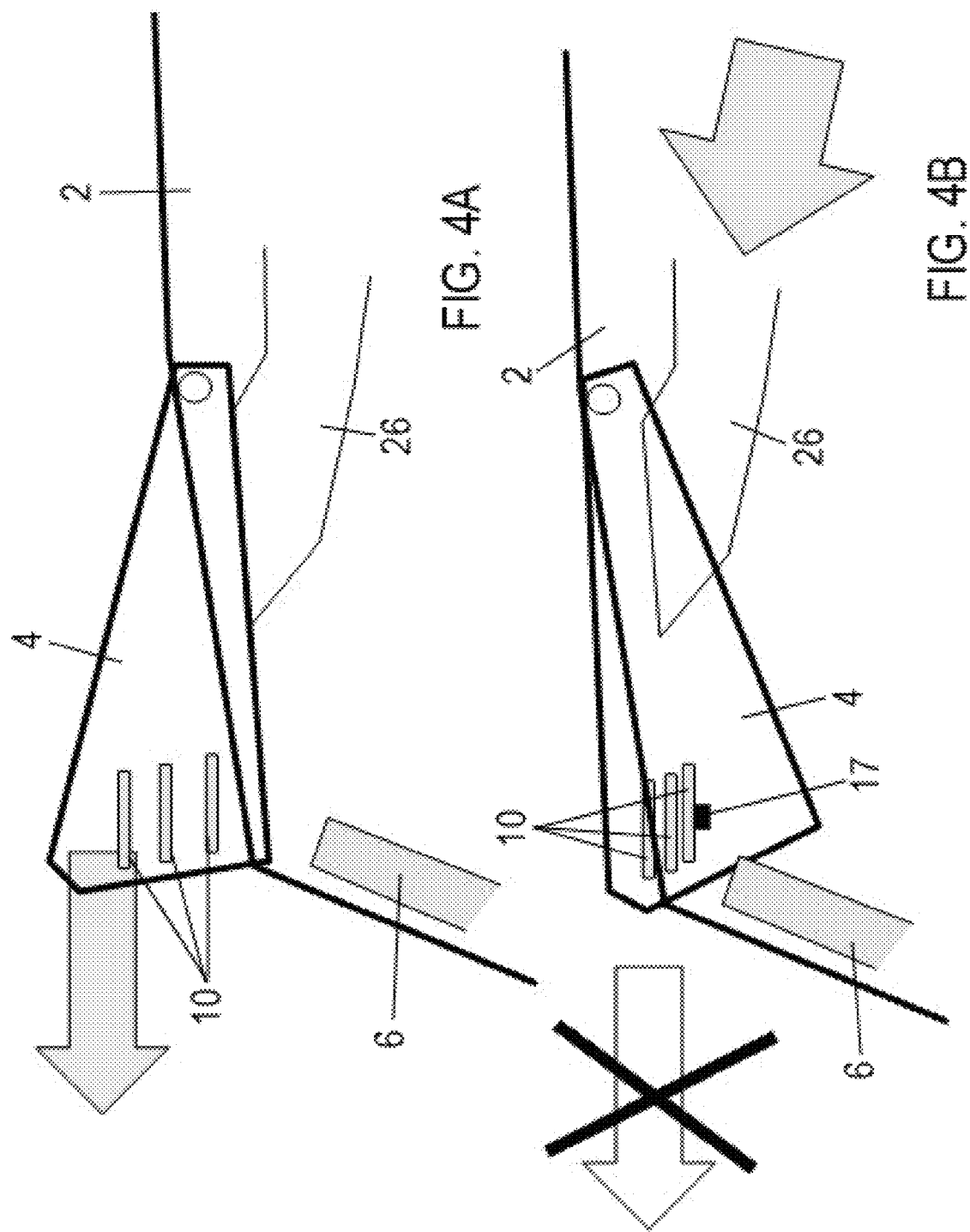
FIGS. 4A-4B show schematic longitudinal sections through the air outlet of the ventilation arrangement of FIG. 1 in an opening position (FIG. 4A) and in a closing position (FIG. 4B)

Now looking at FIGS. 4A and 4B, wherein by means of schematic longitudinal sections through the air outlet 4 the displacement of the slats 10 during the pivoting of the air outlet 4 is illustrated. FIG. 4A shows the air outlet 4 in opening position, FIG. 4B in closing position. In FIG. 4A, the slats 10 are each located in a working position, in which they rest on the engagement steps 16, i.e. each slat 10 bears against two engagement steps 16 located opposite each other. Here, the slats 10 are a certain distance from each other. If the air outlet 4 is now pivoted into closing position, i.e. flush-mounted in the receptacle, the lowermost slat 10 comes to bear against a console-fixed stop 17, which results in that the slats 10 are pushed together and either come to lie on one another or at least have a smaller spacing than in opening position. The slats are then located in a rest position. The entire "slat package" is displaced up to an upper edge 18 of the uppermost engagement step 16 noticeable in FIG. 3 against which it comes to bear. The air outlet 4 therefore requires relatively little installation space in the interior 19 of the console 2. Since the housing 8 has no lower limitation, the air outlet 4 can be arranged relatively near the display 6 (or another function part). The installation space in the interior 19 of the console 2 which as a general rule is tightly packed can be utilized particularly effectively as a result.

If the air outlet 4 is brought into opening position, the slats 10 can fall onto the engagement steps 16 ("fanning-open") in their working positions based on the effect of gravity alone. Since the slats are pushed apart through the elastomer bodies 13, 13', this displacement of the slats 10 is supported through the elastic forces of the elastomer bodies 13, 13'. In addition to this, a position securing of the slats 10 can be achieved through the elastomer bodies 13, 13'.

Figure 5:
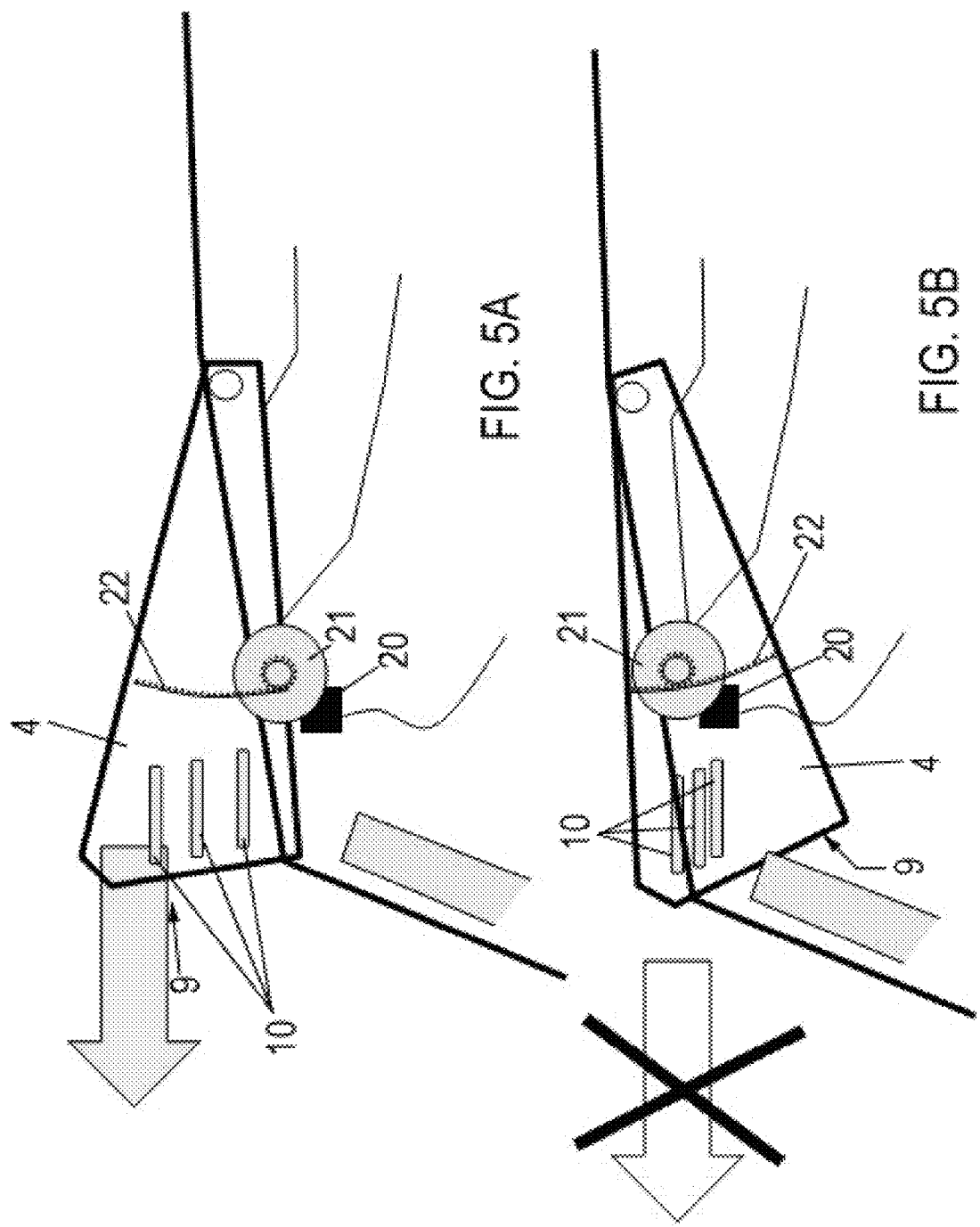
FIGS. 5A-5B show schematic longitudinal sections of an air outlet of the ventialation arrangement of FIG. 1 in opening position (FIG. 5A) and closing position (FIG. 5B) in accordance with another exemplary embodiment.

FIGS. 5A and 5B show schematic longitudinal sections for illustrating a version of the air outlet 4 in opening position (FIG. 5A) and closing position (FIG. 5B). Accordingly, a motor drive is provided for lifting and lowering the air outlet 4, which comprises an electric motor 20 with a driven pinion 21 and a rack 22 attached to the housing 8. The pinion 21 is coupled to the rack 22 by toothings. Because of this, a simple mechanism for pivoting the air outlet 4 can be realized.

Figure 6:
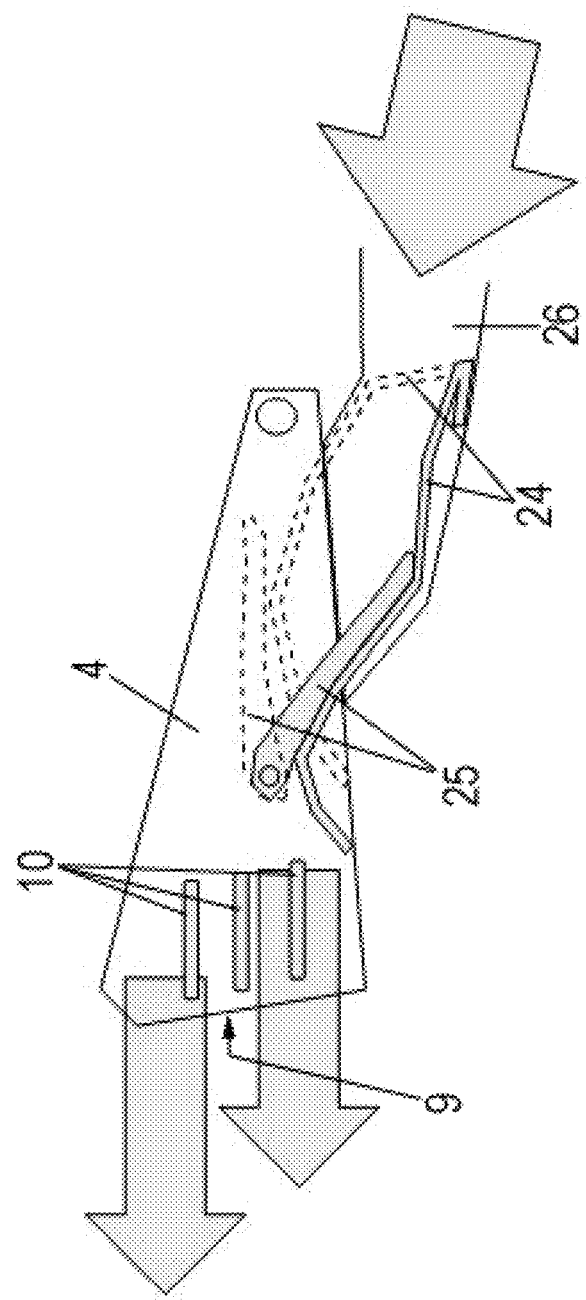
FIG. 6 shows a schematic longitudinal section of an air outlet of the ventialation arrangement of FIG. 1 in accordance with a further exemplary embodiment.

In FIG. 6, a further embodiment of the air outlet 4 is illustrated by means of a schematic longitudinal section. Here, a regulating device 23 for the airflow through the air outflow opening 9 is provided. The regulating device 23 comprises an air-impermeable, preloaded diaphragm 24, which is arranged in an air passage 26 fluidically coupled to the air outlet 4. The diaphragm 24 can be pressed down against the preloading force through a manually actuatable lever 25, so that a flow cross section of the air passage 26 is enlarged. On the other hand, the flow cross section, depending on the position of the lever 25, can be increased through partial or complete relaxing of the diaphragm 24. In this manner, the air quantity can be varied in a particularly simple manner. The regulating device 23 requires comparatively little installation space.

Figure 7:
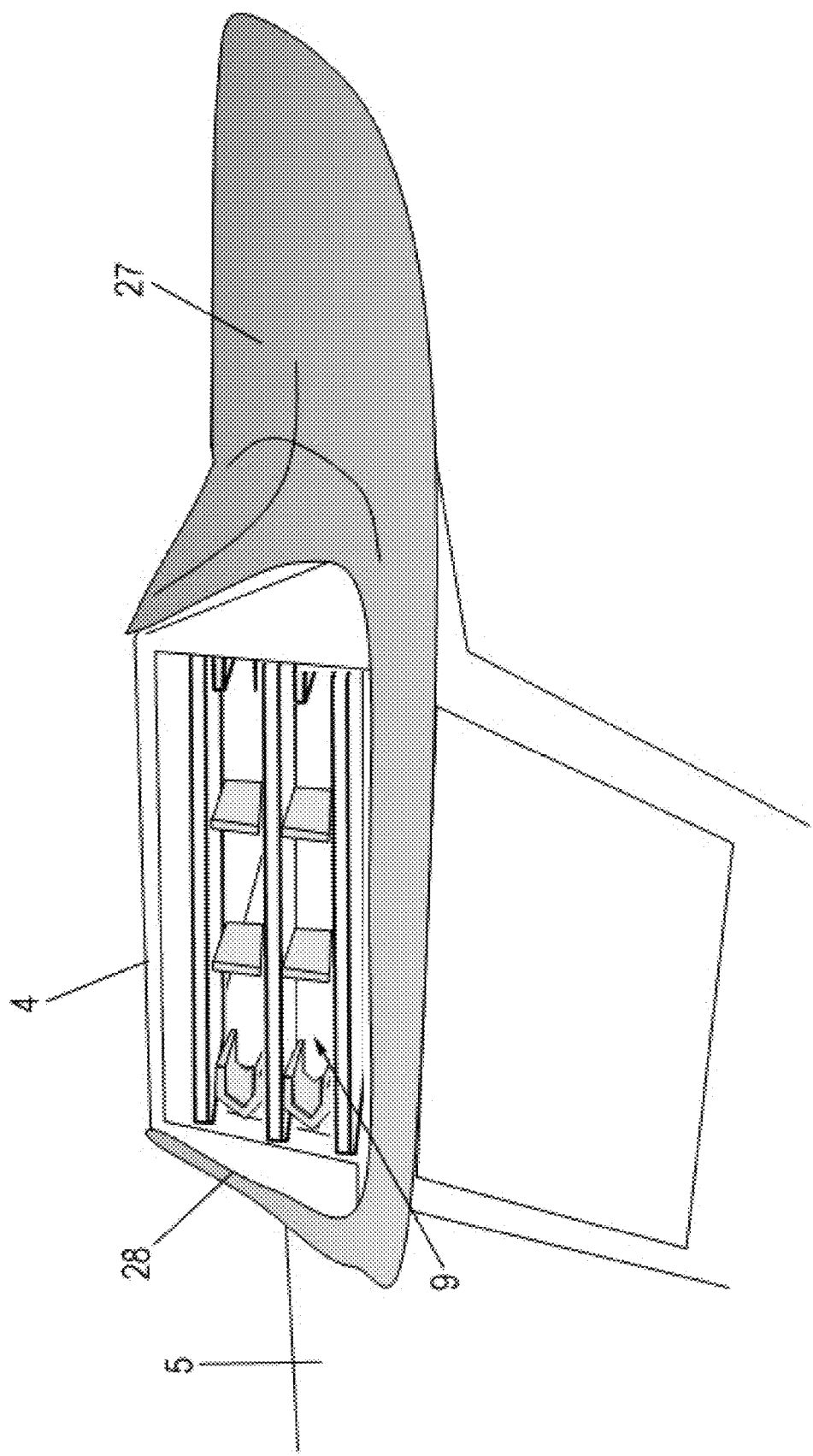
FIG. 7 shows a perspective view of the air outlet of the ventilation arrangement of FIG. 1.

FIG. 7 illustrates a further embodiment of the ventilation arrangement by means of an enlarged perspective view of the console 2. Accordingly, the receptacle 3 and thus the air outlet 4 is covered by an elastically deformable covering 27, which is provided with a covering opening 28. The covering 27 extends as far as over and beyond the receptacle 3 and merges with the console surface 5. As is noticeable in FIG. 7, the covering 27 is elastically deformed through the air outlet 4 located in opening position, wherein the covering 27 conceals the air outlet 4. Here, the air outflow opening 9 is exposed by the cover opening 28, i.e. air can be given off into the vehicle interior through the cover opening 28. Through the covering 27, an aesthetically particularly attractive appearance of the console 2 can be achieved. In closing position, the covering 27 is deformed only a little or not at all. A joint between the receptacle 3 and the air outlet 4 can be concealed through the covering 27.

Figure 8:
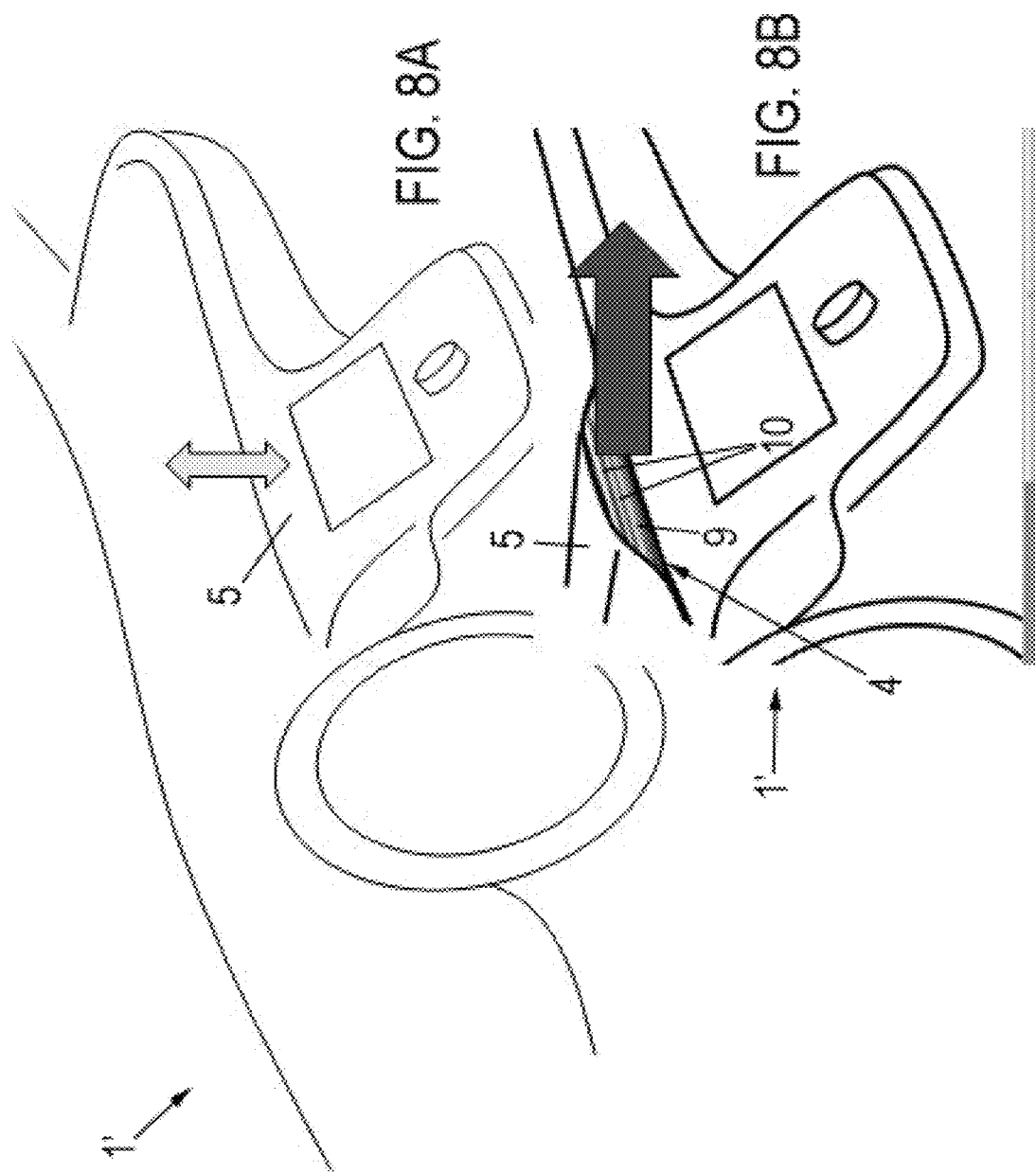
FIGS. 8A-8B show perspective views of a motor vehicle console for illustrating a further exemplary embodiment of the ventilation arrangement.

FIGS. 8A and 8B illustrate a further exemplary embodiment of the ventilation arrangement 1' by means of schematic perspective views. Accordingly, the ventilation arrangement 1' comprises a console 2 with an elastically deformable console surface 5, in which a brake-through 29 is formed. Below the console surface 5, the air outlet 4 is pivotably attached to the console in order to bring the air outlet 4 into opening position and closing position. Here, the console 2 does not comprise any receptacle for the air outlet 4. As is shown in FIGS. 8A and 8B, the air outlet 4 can be brought into opening position subject to elastic deformation of the console surface 5, wherein the expanded break-through 29 forms an air outflow opening 9 of the air outlet 4. On the other hand, the console surface 5 in the lowered closing position is not deformed and the break-through 29 contracted, so that the aesthetic appearance of the console surface 5 is particularly attractive. In this exemplary embodiment of the ventilation arrangement 1', the air outlet 4 need not necessarily require a housing 8, since the air outflow opening 9 is formed by the expanded break-through 29. As in the previous exemplary embodiment, the air outlet 4 is provided with a plurality of slats 10, which are displaceably fastened to a support structure which is not shown in more detail. In order to avoid unnecessary repetitions, reference is made to the explanations made with regard to FIG. 3, 4A, 4B.

Figure 9:
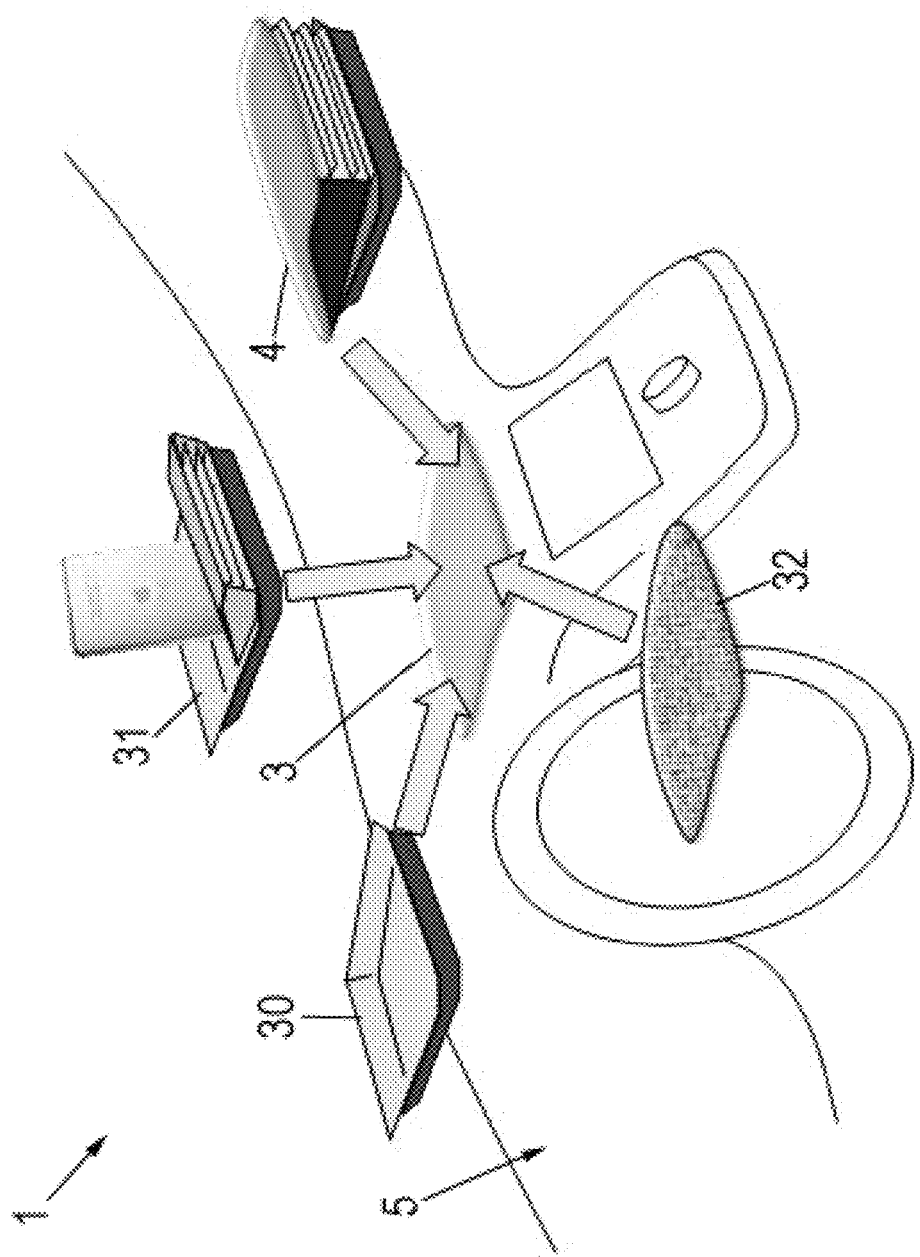
FIG. 9 shows a perspective view of a motor vehicle console for illustrating a further exemplary embodiment of the ventilation arrangement.

In FIG. 9, a further exemplary embodiment of the ventilation arrangement 1 provided with a receptacle 3 is illustrated by means of a perspective view. Here, the air outlet 4 is detachably mounted to the console 2. In addition, the receptacle 3 is designed so that different function parts can be inserted or received. Here, this is for example a drawer 30 embodied as a flat shell for loading with items, or a drawer 31 with integrated fixed air outlet and an air outflow cover 32, which is provided with a plurality of holes 33 for indirect ventilation of the passenger interior. The receptacle 3 can thus be utilized in a variety of ways according to the respective requirements.

Finally, FIGS. 10A and 10B show schematic longitudinal sections through the ventilation arrangement 1 of FIG. 9. FIG. 10 shows a situation, wherein the drawer 31 for example is inserted in the receptacle 3. A discharge of air into the vehicle interior at the receptacle 3 is prevented by this. FIG. 10B shows a further situation, wherein the air outflow cover 32 is inserted in the receptacle 3. Through the holes 33, air can be given off in the vehicle interior for the purpose of an indirect ventilation.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A ventilation arrangement for a motor vehicle, the ventilation arrangement comprising:
    a console with a console surface in which a receptacle is formed;
    an air outlet moveably mounted on the console for movement between an opening position and a closing position, wherein in the opening position the air outlet protrudes from the receptacle and in the closing position the air outlet is at least partially flush-mounted in the receptacle; and
    air guiding elements configured for guiding air flowing out of an airflow opening of the air outlet, wherein the air guiding elements are at least partially displaceably mounted on a support structure of the air outlet for displacement between an opening position and a closing position, and wherein the air guiding elements in the opening position are displaceable into working positions in which adjacent air guiding elements have a larger intermediate spacing, and in the closing position can be displaced into rest positions wherein the adjacent air guiding elements have a smaller intermediate spacing than in the opening position or lie on one another,
    wherein the air guiding elements are mounted so that in the opening position they automatically reach the working positions because of gravity.

2. A ventilation arrangement for a motor vehicle, the ventilation arrangement comprising:
    a console with a console surface in which a receptacle is formed;
    an air outlet moveably mounted on the console for movement between an opening position and a closing position, wherein in the opening position the air outlet protrudes from the receptacle and in the closing position the air outlet is at least partially flush-mounted in the receptacle; and
    air guiding elements configured for guiding air flowing out of an airflow opening of the air outlet, wherein the air guiding elements are at least partially displaceably mounted on a support structure of the air outlet for displacement between an opening position and a closing position, and wherein the air guiding elements in the opening position are displaceable into working positions in which adjacent air guiding elements have a larger intermediate spacing, and in the closing position can be displaced into rest positions wherein the adjacent air guiding elements have a smaller intermediate spacing than in the opening position or lie on one another,
    wherein the air guiding elements are received in opposite engagement recesses, and wherein intermediate spacings of the opposite engagement recesses grow larger with increasing distance from a console-fixed stop.

3. The ventilation arrangement according to claim 2, wherein the opposite engagement recesses are configured in opposite engagement step sequences.

4. The ventilation arrangement according to claim 1, wherein between the adjacent air guiding elements at least one elastically deformable intermediate element is arranged to cause the air guiding elements to automatically reach working position.

5. The ventilation arrangement according to claim 1, wherein the air outlet in the closing position forms a part of the console surface.

6. The ventilation arrangement according to claim 5, wherein the air outlet in the closing position closes off flush with the console surface.

7. The ventilation arrangement according to claim 1, wherein the air guiding elements are parallel slats.

8. The ventilation arrangement according to claim 1, wherein the air outlet is pivotably articulated on the console.

9. A motor vehicle comprising:
    a ventilation system; and
    a ventilation arrangement comprising:
    a console with a console surface in which a receptacle is formed, the receptacle coupled to the ventilation system;
    an air outlet moveably mounted on the console, wherein the air outlet can be moved into an opening position and a closing position, wherein in the opening position the air outlet protrudes from the receptacle and in the closing position the air outlet is at least partially flush-mounted in the receptacle; and
    air guiding elements configured for guiding air flowing out of an airflow opening of the air outlet, wherein the air guiding elements are at least partially displaceably mounted on a support structure of the air outlet for displacement between an opening position and a closing position, and wherein the air guiding elements in the opening position are displaceable into working positions in which adjacent air guiding elements have a larger intermediate spacing, and in the closing position are displaced into rest positions wherein the adjacent air guiding elements have a smaller intermediate spacing than in the working position or lie on one another,
    wherein the air guiding elements are mounted so that in the opening position they automatically reach the working positions because of gravity.

10. The motor vehicle according to claim 9, wherein the air guiding elements are received in opposite engagement recesses, and wherein intermediate spacings of the opposite engagement recesses grow larger with increasing distance from a console-fixed stop.

11. The motor vehicle according to claim 9, wherein the air outlet in the closing position forms a part of the console surface.

12. The motor vehicle according to claim 9, wherein the air outlet is pivotably articulated on the console.

* * * * *